(12) United States Patent
Ueno et al.

(10) Patent No.: US 11,941,590 B2
(45) Date of Patent: Mar. 26, 2024

(54) TOKEN ISSUANCE METHOD, INFORMATION PROCESSOR, AND BLOCKCHAIN SYSTEM

(71) Applicant: double jump.tokyo Inc., Tokyo (JP)

(72) Inventors: Hironobu Ueno, Tokyo (JP); Naohito Tamaya, Tokyo (JP)

(73) Assignee: double jump.tokyo Inc., Tokyo (JP)

( * ) Notice: Subject to any disclaimer, the term of this patent is extended or adjusted under 35 U.S.C. 154(b) by 65 days.

(21) Appl. No.: 17/621,220

(22) PCT Filed: Jun. 21, 2019

(86) PCT No.: PCT/JP2019/024675
§ 371 (c)(1),
(2) Date: Dec. 20, 2021

(87) PCT Pub. No.: WO2020/255372
PCT Pub. Date: Dec. 24, 2020

(65) Prior Publication Data
US 2022/0237575 A1   Jul. 28, 2022

(51) Int. Cl.
*G06Q 40/00* (2023.01)
*G06Q 20/06* (2012.01)

(52) U.S. Cl.
CPC .................................. *G06Q 20/065* (2013.01)

(58) Field of Classification Search
CPC .............................. G06Q 20/065; G06Q 50/10
See application file for complete search history.

(56) References Cited

U.S. PATENT DOCUMENTS

| 10,476,847 | B1 * | 11/2019 | Smith | H04L 63/102 |
| 10,643,288 | B2 * | 5/2020 | Orsini | H04L 9/3239 |

(Continued)

FOREIGN PATENT DOCUMENTS

| EP | 3652885 B1 * | 3/2023 | ......... H04L 63/0807 |
| JP | 6445211 B1 | 12/2018 | |
| JP | 2019-003402 A | 1/2019 | |

OTHER PUBLICATIONS

Oliveira et al: "To Token or not to Token: Tools for Understanding Blockchain Tokens", International Conference of Information Systems (ICIS 2018), San Francisco, USA, Dec. 12, 2018 (Year: 2018).*

(Continued)

*Primary Examiner* — Edward J Baird
(74) *Attorney, Agent, or Firm* — Honigman LLP

(57) ABSTRACT

A token issuance method in a blockchain system includes, transaction parties associated with a transaction for transfer of a right regarding an asset, and an executing party to execute the transaction, and the nodes sharing, as a token, an execution function for a transaction regarding the asset, and information of the asset, the token issuance method including: causing an information processor to generate, information including executing party information, a transaction initiation determination function to, in response to receipt a request for execution of a transaction by the executing party from a predetermined transaction party, perform a process of determining whether to execute the transaction depending on determining whether the request for execution designates the executing party indicated by the executing party information, and a transaction execution function to execute the transaction based on the request for execution, and execute payment of a reward to a right holder.

6 Claims, 7 Drawing Sheets

(56) References Cited

U.S. PATENT DOCUMENTS

| | | | |
|---|---|---|---|
| 2017/0214522 A1* | 7/2017 | Code | H04L 9/3236 |
| 2018/0216946 A1* | 8/2018 | Gueye | G01C 21/3617 |
| 2019/0068365 A1* | 2/2019 | Wright | G06F 16/137 |
| 2019/0095880 A1* | 3/2019 | Glover | G06F 16/1805 |
| 2020/0097950 A1* | 3/2020 | Thompson | H04L 9/3239 |
| 2020/0177579 A1* | 6/2020 | Allen | H04L 63/123 |
| 2021/0133735 A1* | 5/2021 | Maim | G06Q 20/3821 |

OTHER PUBLICATIONS

International Search Report, Application No. PCT/JP2019/024675, dated Sep. 24, 2019. ISA/Japan Patent Office.

"My Crypto Heroes (MCH) | Crypto game from Japan!", [online], [retrieved on May 24, 2019], the Internet (URL: https://www.mycryptoheroes.net/).

"EtherDelta", [online], [retrieved on May 24, 2019], the Internet (URL: https://etherdelta.com/).

* cited by examiner

REWARD INFORMATION

| DISTRIBUTION DESTINATION | DISTRIBUTION RATE |
|---|---|
| ORIGINAL RIGHT HOLDER | 7% OF CONSIDERATION |
| TRANSACTION CONTRIBUTOR | 2.5% OF CONSIDERATION |
| ASSET TRANSACTION NODE | 0.5% OF CONSIDERATION |

PROPOSAL INFORMATION

TOKEN ISSUANCE METHOD, INFORMATION PROCESSOR, AND BLOCKCHAIN SYSTEM

CROSS-REFERENCE TO RELATED APPLICATIONS

This application is the U.S. national stage of PCT/JP2019/024675 filed on Jun. 21, 2019, the contents of which are incorporated herein.

TECHNICAL FIELD

The present disclosure relates to a token issuance method, an information processor, and a blockchain system.

BACKGROUND

A decentralized application has been attracting attention as one of applications of distributed ledger technologies utilizing a so-called blockchain. The decentralized application is implemented by creating blockchain data of a smart contract in which the content or process of a contract related to a token of a cryptocurrency or the like is described. For example, NPL 1 discloses a role playing game that uses items, characters, and the like as digital assets (tokens). In addition, NPL 2 discloses the contents of a Decentralized EXchange (DEX) where users conduct transactions of digital assets on the blockchain.

NPL 1: "My Crypto Heroes (MCH)|Crypto game from Japan!", [online], [retrieved on May 24, 2019], the Internet (URL: https://www.mycryptoheroes.net/)

NPL 2: "EtherDelta", [online], [retrieved on May 24, 2019], the Internet (URL: https://etherdelta.com/)

Such technologies facilitate wide circulation of digital assets (hereinafter simply referred to as assets) on the blockchain. Meanwhile, since the creation of an asset requires considerable cost and time in general, the assets' right holders (for example, a creator and a person who has greatly contributed to the creation) should be given an opportunity to recover the invested capital. However, because of the nature of an asset, once issued on the blockchain, the asset circulates successively from one user to another in a short period of time through numerous transactions, which makes it significantly difficult to recover the invested capital.

The present disclosure is directed to provision of a token issuance method, an information processor, and a blockchain system that are capable of recovering an invested capital of a right holder of an asset in a blockchain system.

SUMMARY

An aspect of the present disclosure is a token issuance method in a blockchain system that includes a plurality of transaction parties and an executing party, as respective nodes, the plurality of transaction parties being associated with a transaction for transfer of a predetermined right regarding a predetermined asset, the executing party being commissioned by one of the transaction parties to execute the transaction, the nodes sharing, as a token, an execution function for a transaction regarding the asset, and information on a history of transfer of the asset, the token issuance method comprising: causing a predetermined information processor to generate, as the execution function for a transaction, information including executing party information specifying the executing party, a transaction initiation determination function to, in response to receipt of a request for execution of a transaction by the predetermined executing party from a predetermined one of the transaction parties, perform a process of determining whether to execute the transaction depending on determination of whether the request for execution designates the executing party indicated by the executing party information, and a transaction execution function to execute the transaction in response to the request for execution, and execute payment of a reward to a predetermined right holder involved in creation of the asset.

Another aspect of the present disclosure is an information processor in a blockchain system that includes a plurality of transaction parties and an executing party, as respective nodes, the plurality of transaction parties being associated with a transaction for transfer of a predetermined right regarding a predetermined asset, the executing party being commissioned by one of the transaction parties to execute the transaction, the nodes sharing, as a token, an execution function for a transaction regarding the asset, and information on a history of transfer of the asset, wherein the information processor generates, as the execution function for a transaction, information including executing party information specifying the executing party, a transaction initiation determination function to, in response to receipt of a request for execution of a transaction by the predetermined executing party from a predetermined one of the transaction parties, perform a process of determining whether to execute the transaction depending on determination of whether the request for execution designates the executing party indicated by the executing party information, and a transaction execution function to execute the transaction in response to the request for execution, and execute payment of a reward to a predetermined right holder involved in creation of the asset.

Still another aspect of the present disclosure is a blockchain system comprising: a plurality of transaction parties associated with a transaction for transfer of a predetermined right regarding a predetermined asset; and an executing party to be commissioned by one of the transaction parties to execute the transaction, as respective nodes, the nodes sharing as a token, an execution function for a transaction regarding the asset, and information on a history of transfer of the asset, wherein the blockchain system stores, as the execution function for a transaction, information including executing party information specifying the executing party, a transaction initiation determination function to, in response to receipt of a request for execution of a transaction by the predetermined executing party from a predetermined one of the transaction parties, perform a process of determining whether to execute the transaction depending on determination of whether the request for execution designates the executing party indicated by the executing party information, and a transaction execution function to execute the transaction in response to the request for execution and execute payment of a reward to a predetermined right holder involved in creation of the asset.

Advantageous Effects

According to the present disclosure, it is possible to recover an invested capital of a right holder of an asset in a blockchain system.

Objects, configurations, and advantageous effects other than those described above may be revealed from the following description of embodiments.

DETAILED DESCRIPTION OF PREFERRED EMBODIMENTS

Hereinafter, embodiments of the present disclosure will be described with reference to the drawings.

Configuration of Blockchain System

Figure 1:
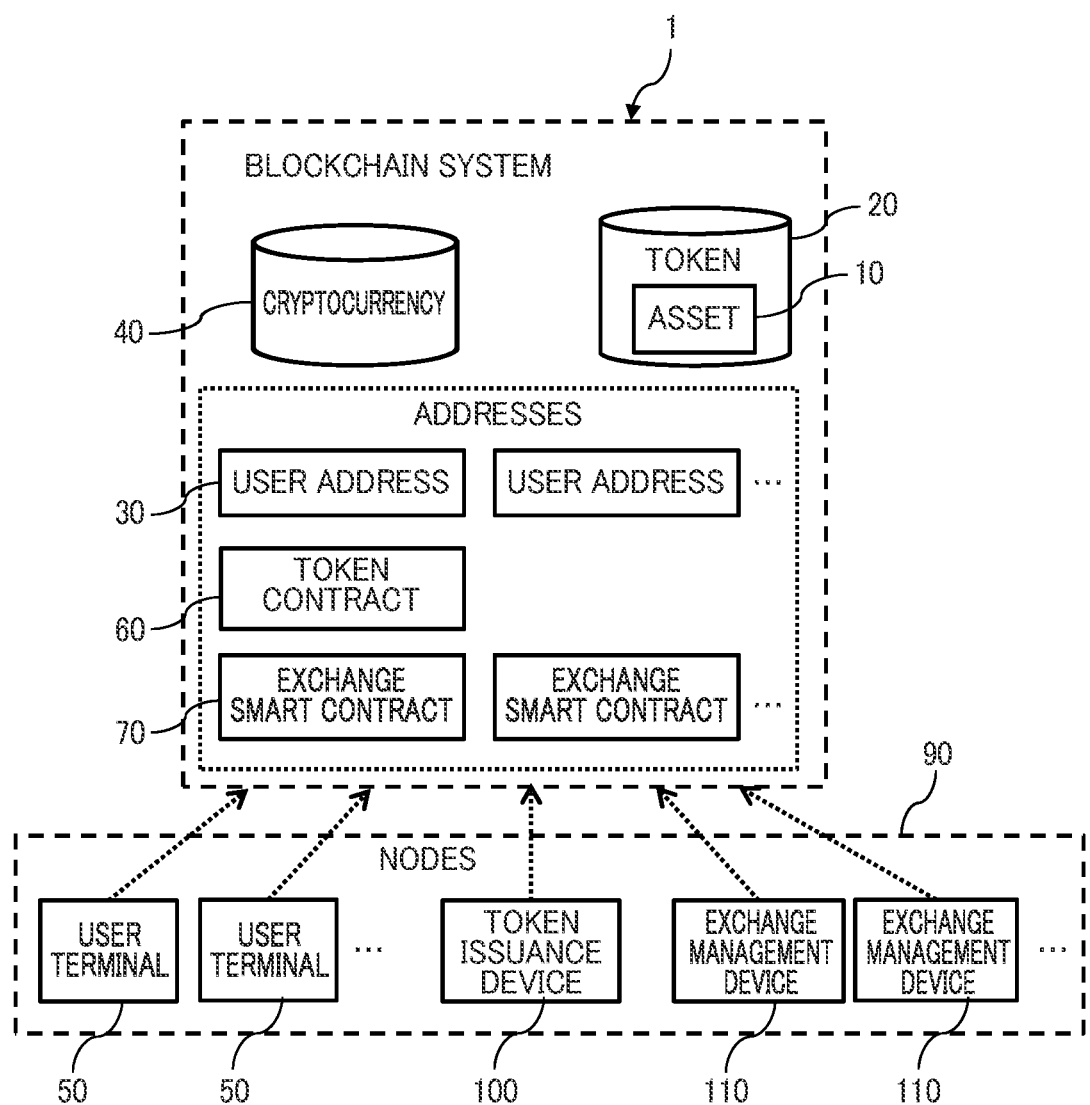
FIG. 1 is a diagram illustrating an example of a configuration of a blockchain system 1 according to an embodiment of the present disclosure.

FIG. 1 is a diagram illustrating an example of a configuration of a blockchain system 1 according to an embodiment of the present disclosure. The blockchain system 1 is a decentralized ledger system comprising nodes 90 (a plurality of user terminals 50, a token issuance device 100, and one or a plurality of exchange management devices 110), which are a plurality of information processors that are connected to one another through a wired or wireless communication network (not illustrated) such as the Internet, LAN, WAN, and/or the like.

Note that the user terminals 50 are information processors to be utilized by users, and each of them are, for example, a portable information terminal such as a smartphone, a personal computer, or a server. The token issuance device 100 and the exchange management device 110 each are an information processor such as a server or the like.

Although the blockchain system 1 is implemented, for example, using an open platform such as Ethereum or the like, another open blockchain system (for example, EOS, NEO, or bitcoin) or a closed blockchain system may be used as long as the blockchain system is capable of implementing smart contracts, which will be described below. Note that a newly developed blockchain system may also be used.

The nodes 90 of the blockchain system 1 share and store, as smart contracts, the history of transfer of the ownership of assets 10, which are predetermined data assets, and the procedure for executing transactions of the assets 10. These smart contracts are shared by means of tokens 20. The tokens 20 are non-fungible tokens (NFTs) the values of which vary with the attributes of the assets 10. Note that the assets 10 are, for example, information on various media (digital assets) such as images, music, texts, game items, and the like, and the types of the assets 10 are not particularly limited.

In addition, the nodes 90 of the blockchain system 1 share and store, as smart contracts, information on the history of transfer of a cryptocurrency 40 that is needed to execute transaction regarding the assets 10. The cryptocurrency 40 is issued at one of the nodes 90 in the blockchain system 1. The cryptocurrency 40 is managed by means of a predetermined address (for example, the address of a wallet) associated with the corresponding one of the nodes 90. The cryptocurrency 40 may be, for example, ETH, which is issued in Ethereum, bitcoin, NEM, and the like.

In addition, each node 90 of the blockchain system 1 manages, as an identifier (address or smart contract) on the network, a user address 30, a token contract 60, and an exchange smart contract 70.

The user address 30 is of a party that owns the asset 10 (token 20), and corresponds to an address on the blockchain system 1 (for example, the Eth address on Ethereum). The user address 30 is associated with corresponding one of the nodes 90 (for example, the user terminal 50).

The token contract 60 is a smart contract for executing processes related to the tokens 20 (for example, issuance of the tokens 20), and corresponds to an address on the blockchain system 1 (for example, an address of a smart contract on Ethereum). The token contract 60 is associated with corresponding one of the nodes 90 (for example, the token issuance device 100).

The exchange smart contract 70 is a smart contract for executing intermediation for transactions of the tokens 20, and corresponds to an address on the blockchain system 1 (for example, an address of a smart contract on Ethereum). The exchange smart contract 70 is a smart contract for achieving a so-called Decentralized EXchange (DEX). The exchange smart contract 70 is of an executing party that is commissioned (as a proxy) by each of the user addresses 30 to execute transaction related to transfer of a predetermined right associated with the assets 10 (tokens 20) (in an embodiment of the present disclosure, trading for the purpose of transfer of the ownership of the assets 10). The exchange smart contract 70 is associated with corresponding one of the nodes 90 (for example, the exchange management device 110).

Features of Blockchain System 1

Next, main features of the blockchain system 1 will be described.

Features Regarding Transaction of Tokens

Figure 2:
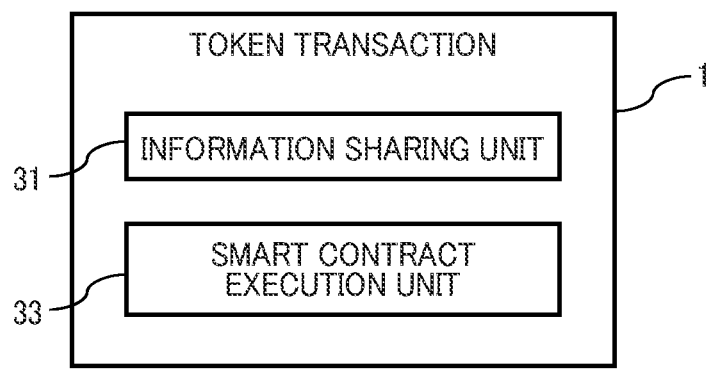
FIG. 2 is a diagram illustrating an example of features related to transaction of tokens.

FIG. 2 is a diagram illustrating an example of features related to transaction of the tokens 20. The blockchain system 1 comprises features of an information sharing unit 31 and a smart contract execution unit 33.

The information sharing unit 31 shares the tokens 20 in the form of blockchain data among the nodes 90. In addition, the information sharing unit 31 shares, among the nodes 90, information on the history of transfer (payment) of the cryptocurrency 40 among the nodes 90, in the form of blockchain data.

For example, the information sharing unit 31 generates, at a predetermined timing, new block data that contains the history of transfer of the ownership of one or a plurality of the assets 10 (transaction data), and a hash value and a predetermined nonce of the previous block data. The information sharing unit 31 generates blockchain data obtained by linking the previous block data and the newly generated block data together via the hash value, and shares the generated blockchain data as the token 20 among the nodes 90 in the blockchain system 1.

The smart contract execution unit 33 executes the smart contract related to the token 20, to thereby perform transaction regarding the assets 10. In addition, the smart contract execution unit 33 executes a predetermined smart contract related to the cryptocurrency 40, to thereby perform transfer (remittance) of the cryptocurrency 40.

Features Regarding Issuance of Tokens

Figure 3:
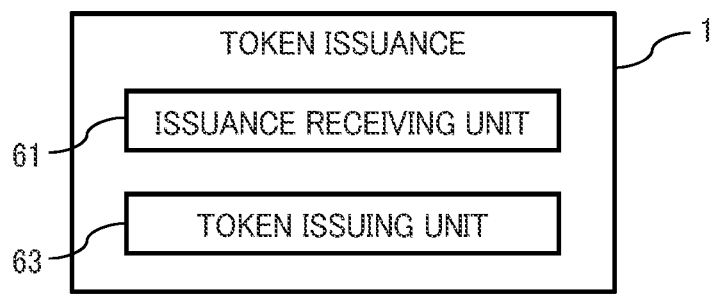
FIG. 3 is a diagram explaining an example of features related to issuance of tokens.

FIG. 3 is a diagram explaining an example of features related to the issuance of the tokens. The blockchain system 1 comprises an issuance receiving unit 61 and a token issuing unit 63.

The issuance receiving unit 61 executes processes needed for issuing the token 20 related to the asset 10 (for example, receives a predetermined cryptocurrency 40 from a predetermined user address 30). The token issuing unit 63 generates a new token 20 in which ownership information on a predetermined issuance destination (for example, the user address 30) is registered.

Figure 4:
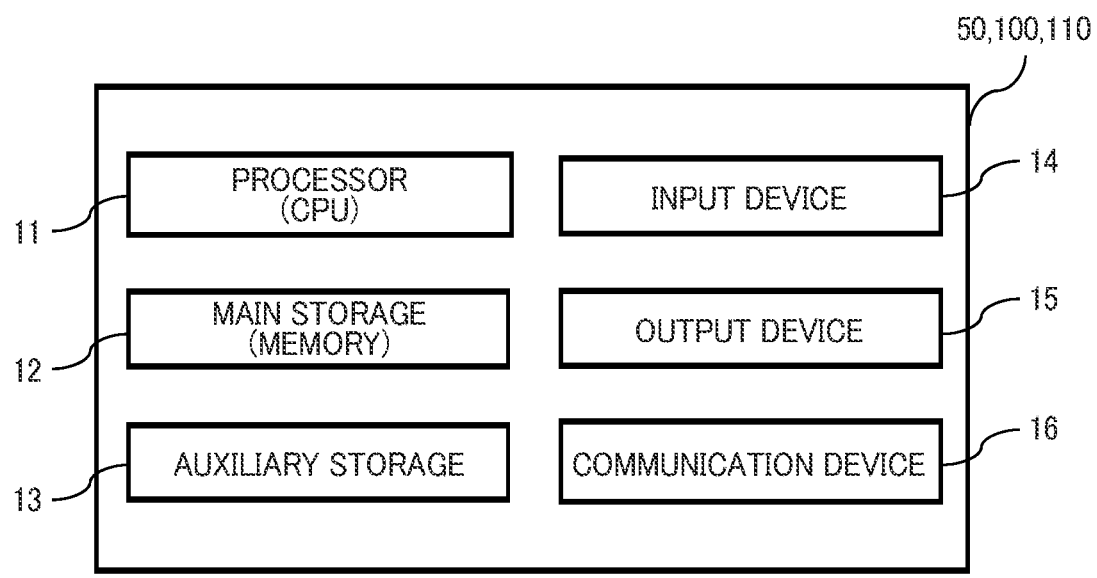
FIG. 4 is a diagram illustrating an example of hardware that each information processor comprises.

Here, FIG. 4 is a diagram illustrating an example of hardware included in each information processor of the user terminal 50, the token issuance device 100, and the exchange management device 110. Each information processor is an information processor including: a processor 11 such as a central processing unit (CPU); a main storage 12 such as a random access memory (RAM), a read only memory (ROM), or the like; an auxiliary storage 13 such as a hard disk drive (HDD), a solid state drive (SSD), and/or the like; an input device 14 including a keyboard, a mouse, a touch panel, and/or the like; an output device 15 including a monitor (display) and/or the like; and a communication device 16 which communicates with other information processors. Each feature unit of each information processor, which has been described hereinabove, is implemented by the hardware of each information processor or by causing the processor 11 of each information processor to execute a program (a smart contract or the like) stored in the main storage 12 or the auxiliary storage 13. Such a program is stored in, for example, a storage such as a secondary storage, a non-volatile semiconductor memory, a hard disk drive, or an SSD, or in a non-transitory data storage medium that is readable using the nodes 90, such as an IC card, an SD card, or a DVD.

Description of Processes

Next, processes performed in the blockchain system 1 will be described. The blockchain system 1 executes (1) a token issuing process of issuing a new token 20 (asset 10), (2) a transaction accepting process of accepting a request for commission from the user address 30 regarding the transaction of the asset 10 between the user addresses 30, and (3) an asset transaction process of executing the transaction of the asset 10 for which the request for commission has been received.

Token Issuing Process

Figure 5:
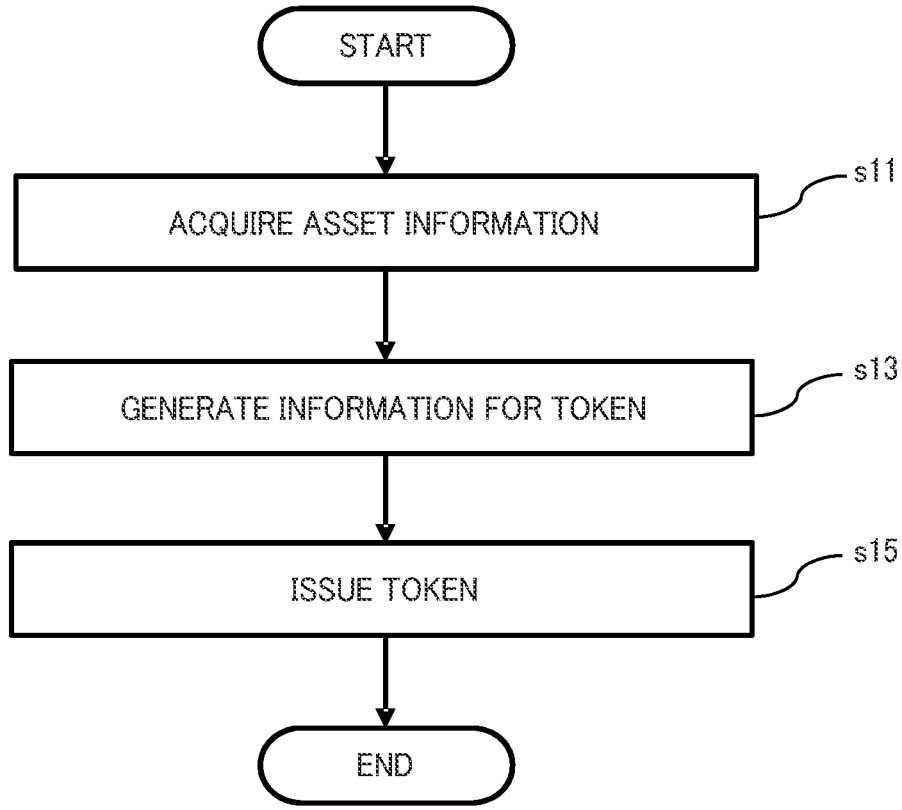
FIG. 5 is a flowchart explaining an example of a token issuing process.

FIG. 5 is a flowchart explaining an example of the token issuing process. First, the token contract 60 receives registration of information on the payment of the cryptocurrency 40 and the like as conditions for issuing the token 20.

Then, the token contract 60 acquires asset information (described later in detail) or issuing the token 20 (s11). Note that the asset information may be stored in advance, or registration of the asset information may be received from the outside. Then, the token contract 60 generates information needed for the token 20 based on the acquired asset information 400 (s13). Then, the token 20 is issued (s15).

Asset Information

Figure 6:
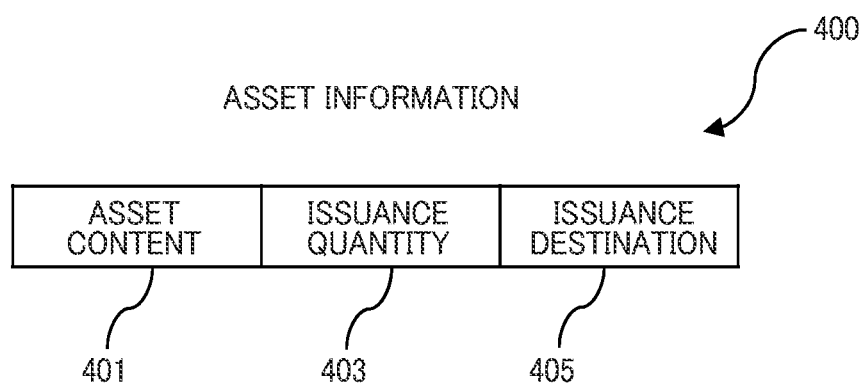
FIG. 6 is a diagram illustrating an example of asset information.

FIG. 6 is a diagram illustrating an example of the asset information. The asset information 400 includes pieces of information of an asset content 401, which is information for specifying the content of the asset 10 related to the token 20 to be issued (for example, an image, music, a text, a game item, or the like), an issuance quantity 403, which is information for specifying the quantity of the tokens 20 (or the assets 10) to be issued, and an issuance destination 405 for the token 20.

Token

Figures 7, 8:
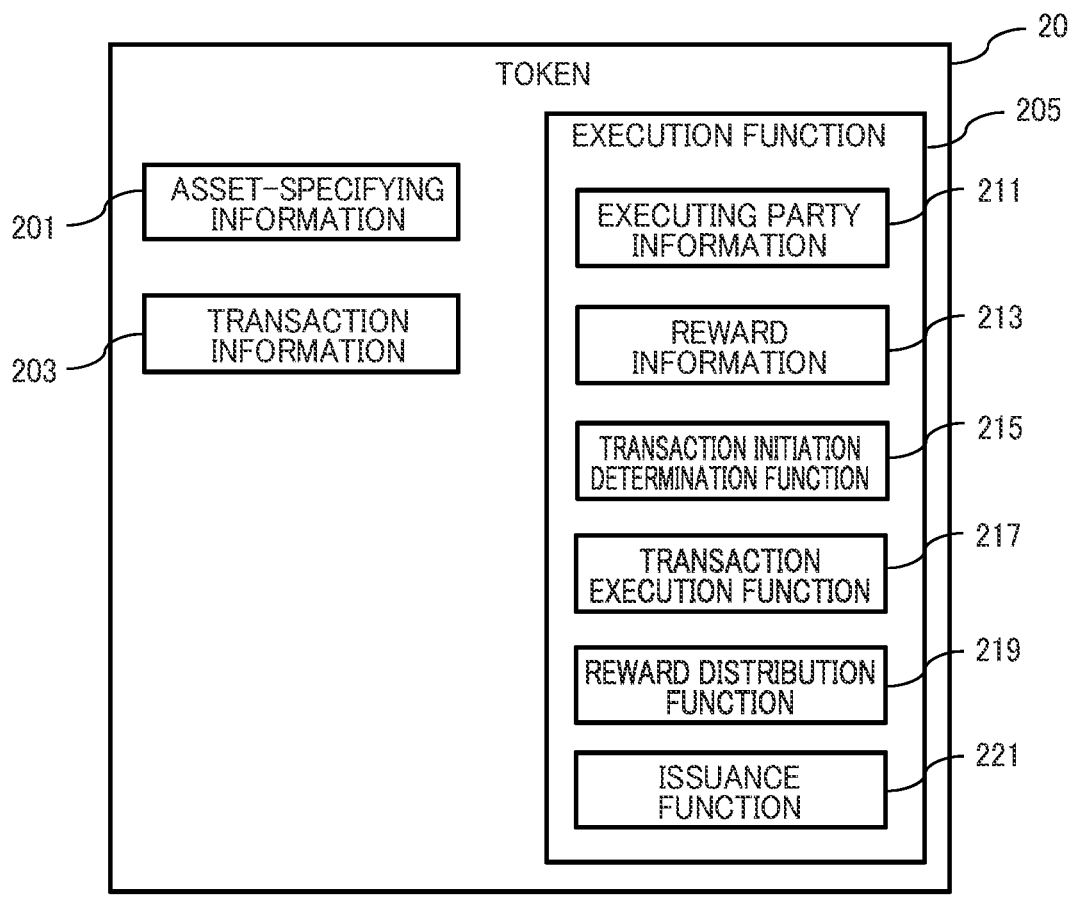
FIG. 7 is a diagram illustrating an example of a token.
FIG. 8 is a diagram illustrating an example of reward information.

FIG. 7 is a diagram illustrating an example of the token 20. The token 20 includes asset-specifying information 201, which is information for specifying the content of the asset 10 (for example, an image, music, a text, a game item, or the like), transaction information 203, which is information (transaction data) on the history of transaction of the asset 10 between the user addresses 30, and an execution function 205, which is information defining the execution process of transaction regarding the asset 10. Note that the content of the transaction information 203 is updated (added) in response to the transaction of the asset 10.

The execution function 205 is configured as a smart contract. The execution function 205 includes executing party information 211, reward information 213, a transaction initiation determination function 215, a transaction execution function 217, a reward distribution function 219, and an issuance function 221.

The executing party information 211 is information for specifying an executing party that is capable of receiving a request for commission from the user address 30 and executing transaction between the user addresses 30. For example, in the executing party information 211, the address or identifier of one or a plurality of exchange smart contracts 70 is set.

It is assumed that the content of the executing party information 211 is freely changed after the manager or the like of the token 20 (for example, the issuer of the token 20) issues the token 20. For example, the address or identifier of the exchange smart contract 70 that is capable of executing transaction can be added, changed, or deleted.

Note that the method for changing the executing party information 211 is, for example, as follows: when the token 20 is generated, a function that changes the executing party information 211 is added to the execution function 205, and the execution function 205 invokes this function, to thereby change the content of the executing party information 211. Note that the token contract 60 may be configured to issue a new token 20 that has executing party information 211 including the corrected address or identifier of the exchange smart contract 70.

Next, the reward information 213 is information on distribution destinations of rewards (for example, the cryptocurrency 40 to be paid as a transaction fee of the asset 10 (token 20), an execution fee, a predetermined right compensation, or the like) that are generated based on the transaction of the asset 10 by the executing party and the distribution rates of the rewards to the distribution destinations.

The distribution destinations of the reward information 213 include a predetermined right holder involved in the creation of the asset 10. This predetermined right holder (hereinafter referred to as original right holder) is, for example, a creator of the asset 10 or a person who contributed to the creation of the asset 10 (for example, a copyright holder of the asset 10). Note that the reward information 213 may be changed after issuance of the token 20 in the same manner as the executing party information 211.

Note that in the issuance of the token 20, the predetermined information processor displays a screen for inputting the reward information 213, and receives input of the reward information 213 from the user.

Reward Information

FIG. 8 is a diagram illustrating an example of the reward information 213. The reward information 213 includes information on distribution destinations 2131 of the respective rewards and distribution rates 2133 with respect to the respective distribution destinations. In the example of FIG. 8, 7% of the total consideration is paid as the reward to the node 90 (user address 30) related to the original right holder, 2.5% of the total consideration is paid as the reward to the user address 30 related to a person who contributed to the transaction, and 0.5% of the total consideration is paid as the reward to a predetermined exchange smart contract 70 (the exchange smart contract 70 that received a request for commission from the user addresses 30). Note that other rewards are paid to, for example, the user address 30 related to the owner of the asset 10 (the user address 30 that applied for the transaction).

Next, as illustrated in FIG. 7, the transaction initiation determination function 215 is a function that determines whether to execute the transaction of the token 20 (under a commission from the user node 30). The transaction execution function 217 is a function that executes the transaction of the token 20 based on the transaction initiation determination function 215. The reward distribution function 219 is a function that executes a process of distributing the rewards to predetermined distribution destinations when the transaction of the token 20 is executed. The issuance function 221 is a function that executes a process of issuing the token 20.

Next, a transaction accepting process regarding the issued token 20 will be described.

Transaction Receiving Process

Figure 9:
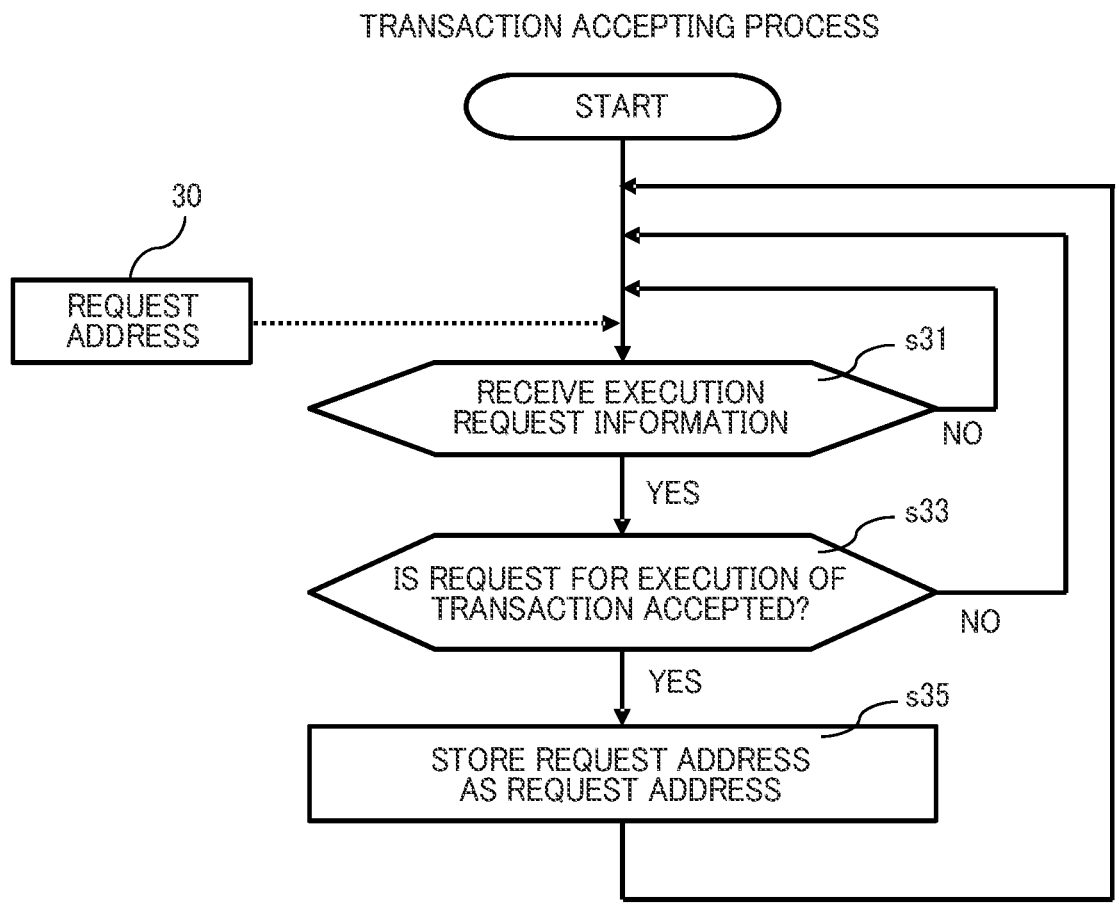
FIG. 9 is a flowchart explaining an example of a transaction accepting process.

FIG. 9 is a flowchart explaining an example of the transaction accepting process. First, the execution function 205 receives information (execution request information) for requesting the execution of transaction of the asset 10 between the user addresses 30 from the predetermined user address 30 (hereinafter referred to as request address) (s31).

Execution Request Information

Figure 10:
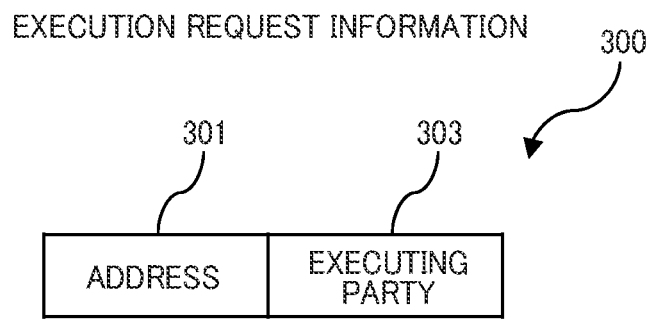
FIG. 10 is a diagram illustrating an example of execution request information.

Here, FIG. 10 is a diagram illustrating an example of the execution request information 300. The execution request information 300 includes information on an address 301, which is information (for example, the address of the user address 30) that specifies the request address, and information on the executing party 303, which specifies the target of the request for execution of the transaction (commissioned party, for example, the address of the exchange smart contract 70).

Next, as illustrated in s33 of FIG. 9, the execution function 205 determines whether to accept the request for execution made by the execution request information 300. Specifically, for example, the execution function 205 determines whether the information on the executing party 303 of the received execution request information 300 is contained in the executing party information 211 (designated or not).

When the request for execution is not accepted (s33: NO), the execution function 205 ends the transaction accepting process. When the request for execution is accepted (s33: YES), the execution function 205 stores, as the source user address 30 of the request for execution (commissioning party), the user address 30 with which the execution request information has been registered (hereinafter referred to as the request address) (s35). After this, the process of s31 is repeated. Note that the transaction accepting process is repeated until two or more request addresses are fixed.

Next, an asset transaction process of executing the transaction between the request addresses will be described.

Asset Transaction Process

Figure 11:
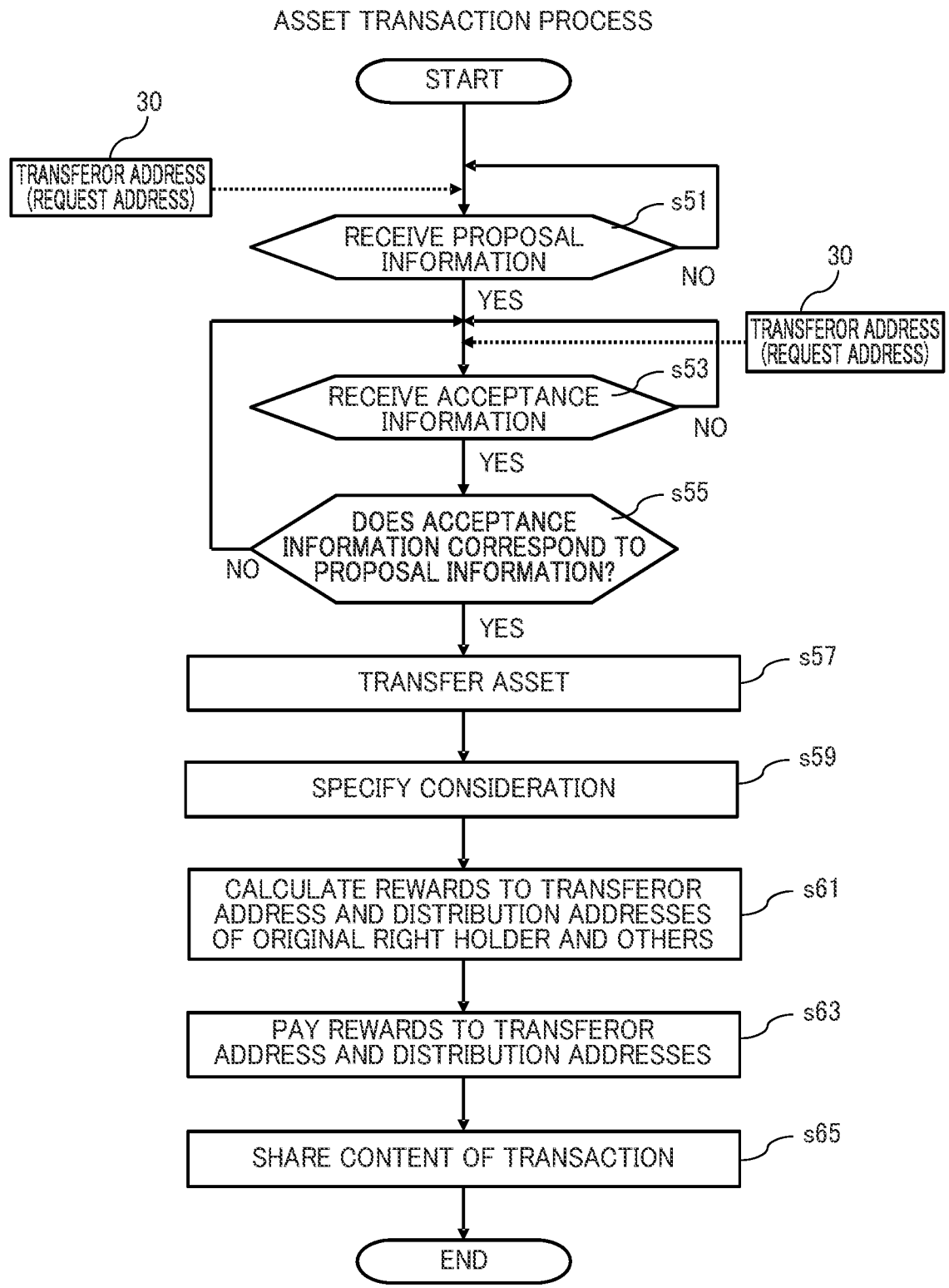
FIG. 11 is a flowchart explaining an example of an asset transaction process.

FIG. 11 is a flowchart explaining an example of the asset transaction process. First, the transaction initiation determination function 215 receives registration of proposal information regarding the asset 10 (hereinafter referred to as the transaction asset) from one (the seller of the asset 10, hereinafter referred to as transferor address) of request addresses (s51).

Proposal Information

Figure 12:
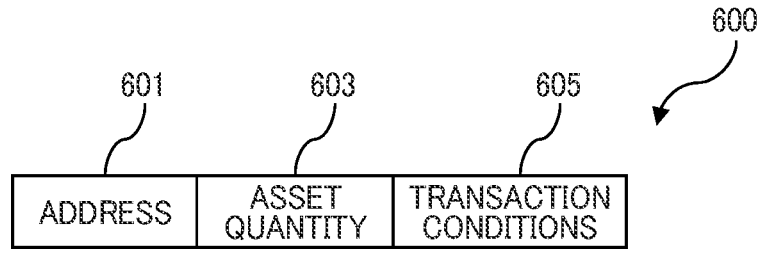
FIG. 12 is a diagram illustrating an example of proposal information.

Here, FIG. 12 is a diagram illustrating an example of the proposal information 600. The proposal information 600 is information that stores the details of the application of the transaction related to the transaction asset, and includes various information on addresses 601, which are information that specifies the request addresses (for example, addresses of the user addresses 30), an asset quantity 603, which is the transaction quantity of the transaction asset, and transaction conditions 605 regarding other conditions (for example, the value of the cryptocurrency 40, which serves as a consideration demanded for the transaction) related to the transaction asset.

Next, as illustrated in s53 of FIG. 11, the transaction initiation determination function 215 receives registration of information on acceptance corresponding to the proposal information 600 (hereinafter referred to as acceptance information) from the request address (the buyer of the asset 10, hereinafter referred to as transferee address) that is different from the transferor address.

The transaction initiation determination function 215 determines whether the proposal information 600 and the acceptance information correspond to each other (s55). Specifically, for example, the transaction initiation determination function 215 determines whether the value of the cryptocurrency 40 registered with the proposal information 600 and the value of the cryptocurrency 40 registered with the acceptance information are equal.

In the proposal information 600 and the acceptance information do not correspond to each other (s55: NO), the transaction initiation determination function 215 again waits for registration of other acceptance information from any of the request addresses (s53). When the proposal information 600 and the acceptance information correspond to each other (s55: YES), the transaction execution function 217 executes the following processes.

In other words, first, the transaction execution function 217 transfers the transaction asset under the conditions indicated by the proposal information 600 (and the acceptance information) (s57). Specifically, for example, the transaction execution function 217 registers the transfer of the ownership from the transferor address to the transferee address with the transaction information 203 in the token 20.

Next, the reward distribution function 219 specifies the consideration of the transaction related to the transaction asset (s59). Specifically, for example, the reward distribution function 219 acquires information on the consideration (the value of the cryptocurrency 40) indicated by the proposal information 600 (and the acceptance information).

The reward distribution function 219 calculates the reward (asset payment) to the transferor address and the rewards (fee, royalty, and the like) to the addresses (hereinafter referred to as distribution addresses) related to the other nodes 90 based on the consideration specified in s59 (s61). Specifically, for example, the reward distribution function 219 refers to the reward information 213 of the token 20 related to the transaction asset and calculates the rewards for the respective distribution addresses by multiplying the value of the cryptocurrency 40 specified in s59 by the distribution rates 2133 of the rewards to be distributed to the respective distribution destinations 2131. Note that the distribution destination 2131 of the reward information 213 includes information on the address related to the node 90 related to the original right holder, as described above, in addition to the transferor address.

The reward distribution function 219 pays the rewards to the transferor address and the distribution addresses based on the rewards calculated in s61 (s63). Specifically, for example, the reward distribution function 219 specifies all the addresses of the nodes 90 related to the reward information 213 specified in s61. Then, the reward distribution function 219 adds, to the blockchain data related to the cryptocurrency 40, information that the respective values of the cryptocurrency 40 specified in s61 are transferred from the transferee address to the addresses of the specified respective nodes 90.

Thereafter, at a predetermined timing, the execution function 205 shares the content of the above-described transaction in the blockchain system 1 (s65). Specifically, for example, the execution function 205 transmits, to all the nodes 90, the blockchain data (token 20) obtained by adding the information on the transfer of the transaction asset to the transaction information 203, and thereafter, all the nodes 90 share and store this blockchain data (token 20) through a predetermined consensus-building process. Note that information on the transfer of the cryptocurrency 40 is also shared in the same procedure.

Figure 13:
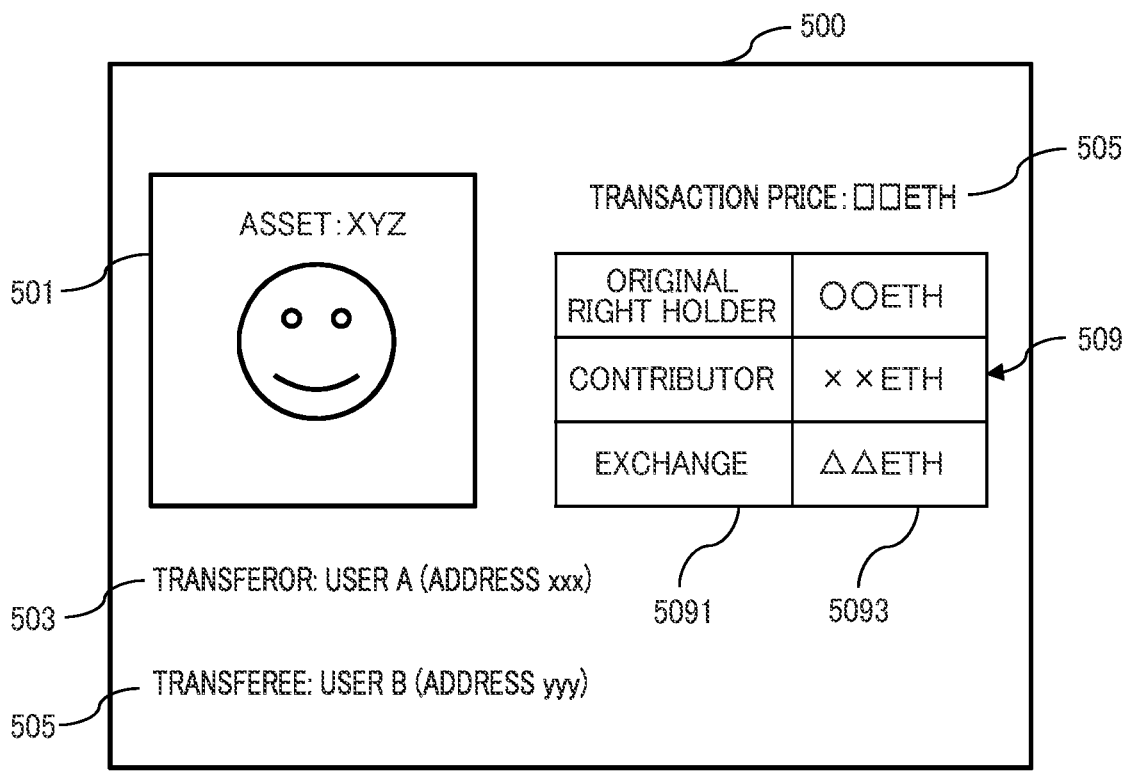
FIG. 13 is an example of an asset transaction screen.

Note that FIG. 13 is an example of a screen (asset transaction screen) displayed on each node 90 of the blockchain system 1 in the asset transaction process. The asset transaction screen 500 displays information indicating the content of the asset 10 (asset information 501), information on the transferor address (the seller 503 of the asset 10), information on the transferee address (the buyer 505 of the asset 10), the consideration, which is the sum of the rewards to be paid upon consummation of the transaction, (transaction price 507), and information on the rewards to be paid upon consummation of the transaction (reward information 509). Note that the reward information 509 contains information on payment recipients 5091 of the rewards related to the asset 10 and distribution quantities 5093 of the rewards.

As described above, in the blockchain system 1 of an embodiment of the present disclosure, the predetermined information processor generates smart contract in the blockchain system 1, including (1) the transaction initiation determination function 215, which performs the process of determining whether to execute the transaction by referring to the executing party information 211 upon receipt of a request for execution of transaction from the application address, and (2) the transaction execution function 217, which executes the transaction based on the request and executes the payment of the rewards to the right holders involved in the creation of the asset 10.

This enables only the executing party (exchange smart contract 70), which is capable of being commissioned to execute transaction of the asset 10 among the user addresses 30, to reliably distribute the rewards to the right holder (creator and the like) involved in the creation of the asset 10. For example, the manager or the like of the asset 10 (token 20) sets, in the executing party information 211, only the executing party (exchange smart contract 70) that has agreed on distribution of the rewards to the creator and the like, thereby being able to reliably distribute the rewards to the creator and the like.

In this way, according to the blockchain system 1 of an embodiment of the present disclosure, it is possible to recover the invested capital of the right holder of the asset 10 in the blockchain system 1. In particular, even when the asset 10 is circulated successively among the user address 30 in the blockchain system 1, it is possible to reliably recover the invested capital of the right holder for every transaction.

In addition, in the blockchain system 1 of an embodiment of the present disclosure, the predetermined information processor further generates, as the execution function, information including reward information on a distribution destination of a reward that is generated for the transaction, the reward information including information on the predetermined right holder, and a reward distribution function to perform a process of distributing the reward to the distribution destination indicated by the reward information when the transaction execution function executes the payment of the reward.

In this way, the reward distribution function is provided as smart contract, the reward distribution function performing the process of distributing rewards to distribution destinations related to the reward information, which includes an original right holder, when the payment of reward is executed. This makes it possible to reliably distribute rewards to right holders involved in the creation of the asset 10.

In addition, in the blockchain system 1 of an embodiment of the present disclosure, the reward information includes information which determines a distribution destination of the reward and a distribution quantity of the reward to be distributed to the distribution destination, and when the transaction execution function executes the transaction, the reward distribution function performs a process of distributing the reward in the distribution quantity indicated by the reward information, to the distribution destination indicated by the reward information.

In this way, the rewards are distributed to the distribution destinations indicated by the reward information 213 in the distribution quantities indicated by the reward information 213. This makes it possible to distribute appropriate quantities of rewards to the respective distribution destinations including the right holders involved in the creation of the asset 10, when the transaction execution function 217 executes a transaction.

In addition, in the blockchain system 1 of an embodiment of the present disclosure, the predetermined information processor displays a predetermined screen for receiving input of the reward information.

In this way, receiving input of the reward information 213 related to the transaction of the asset 10 makes it possible for the issuer of the asset 10 to provide an appropriate reward to the right holder involved in the creation of the asset 10.

In addition, the blockchain system 1 of an embodiment of the present disclosure displays, on a predetermined screen, information on the distribution destination to which the reward is distributed by the reward distribution function.

This makes it possible for the user of the blockchain system 1 to confirm that the reward has been distributed to the right holder involved in the creation of the asset 10 in the transaction of the asset 10.

The description of an embodiment described above is for facilitating the understanding of the present disclosure and does not limit the present disclosure. The present disclosure can be changed and modified without departing from the gist of the present disclosure, and the present disclosure encompasses the equivalents thereof.

For example, in an embodiment of the present disclosure, the reward information 213 and the reward distribution function 219 may be provided in the transaction execution function 217.

In addition, it is assumed in an embodiment of the present disclosure that the transaction performed by the user addresses 30 is the transaction for transfer of an ownership (trading or the like), however, the transaction may be a transaction for transfer of a use right or another right.

In addition, part of information units or feature units of the nodes 90 described in an embodiment of the present disclosure may be provided in another feature unit or information unit. For example, part or all of the contents of the executing party information 211 may be set in the asset 10 or in the asset-specifying information 201 or the like of the token 20.

In addition, in the executing party information 211, any information for controlling transaction (conditions regarding transaction parties, conditions regarding a transaction target, and/or the like) may be set in addition to or in place of the information described in an embodiment of the present disclosure.

In addition, the payment recipients of rewards defined in the reward information 213 may be any nodes 90 (addresses) other than those described in an embodiment of the present disclosure.

In addition, the consideration or reward for transaction may be any value medium other than the cryptocurrency 40.

In addition, it is assumed in an embodiment of the present disclosure that the information processor that is associated with the address or smart contract in the blockchain system 1 performs processes. However, such a configuration may be employed that a predetermined information processor outside the blockchain system 1 performs processes and information thus generated is introduced into the blockchain system 1.

The invention claimed is:

1. A computer program product for allowing a computer, connected to a plurality of user terminals of transaction parties of an asset in a blockchain system where an information on the asset is shared and stored in each of the user terminals, to issue a token, the computer program product comprising a non-transitory, machine-readable medium storing instructions, which when executed by at least one programmable processor, causes the at least one programmable processor to execute processing comprising:
   receiving, by a processor, from one of the plurality of user terminals, an information on the asset;
   receiving, by the processor, a request for a transaction regarding the asset;
   storing, by the processor, information indicating a transfer of a right regarding the asset from a first user terminal to a second user terminal of the plurality of user terminals;
   generating the token of the asset including a smart contract, the smart contract including:
      a transaction initiation determination function, wherein the transaction initiation determination function receives, from one of the plurality of user terminals, a request for execution of a transaction between the one of the user terminals and a user terminal of another transaction party of the asset, and determines whether or not an executing party information being an identifier of a predetermined user terminal of an executing party of a transaction of the asset in the blockchain system is included in the request; and
      a transaction execution function, wherein the transaction execution function, when determining that the executing party information is included in the request for execution, stores an information indicating a transfer of a right regarding the asset from the one of the user terminal to the user terminal of another transaction party into each of the user terminals in the blockchain, and stores an information on a reward to a predetermined right holder involved in creation of the asset into each of the user terminals in the blockchain system;
   storing the generated token into each of the user terminals in the blockchain;
   storing reward information on a distribution destination of a reward that is generated for the transaction, the reward information including information on the predetermined right holder; and
   wherein the transaction execution function stores an information of a reward that is generated for the transaction into a user terminal of the distribution destination indicated by the reward information; and
   displaying a predetermined screen for receiving input of the reward information.

2. The computer program product according to claim 1, wherein the reward information further includes information for determining a distribution destination of the reward and a distribution quantity of the reward to be distributed to the distribution destination, wherein the transaction execution function stores an information on the distribution quantity of the reward into a user terminal of the distribution destination indicated by the reward information.

3. A blockchain system comprising:
   a plurality of user terminals of transaction parties that have a right regarding an asset;
   an exchange management device of an executing party executing intermediation for a transaction of the asset on behalf of the transaction parties and agreeing on a distribution of reward to a predetermined right holder involved in a creation of the asset;
   a processor disposed in each user terminal of the plurality of user terminals, the processor configured to generate a token of the asset including a smart contract, the smart contract including:
      a transaction initiation determination function, wherein the transaction initiation determination function receives, from one of a plurality of user terminals of transaction parties of the asset in a blockchain system where an information on the asset is shared and stored in each of the user terminals, a request for execution of a transaction between the one user terminal and a user terminal of another transaction party of the asset, and determines whether or not an executing party information being an identifier of the exchange management device in the blockchain system is included in the received request for execution; and
      a transaction execution function, wherein the transaction execution function, when determining that the executing party information is included in the request for execution, stores an information indicating a transfer of a right regarding the asset from the one user terminal to the user terminal of another transaction party into each of the user terminals in the blockchain, and stores an information on a reward to a predetermined right holder involved in creation of the asset into each of the user terminals in the blockchain system;

configured to execute a process of storing the generated token into each of the user terminals in the blockchain; and the processor is further configured to store reward information on a distribution destination of a reward that is generated for the transaction, the reward information including information on the predetermined right holder; and wherein the transaction execution function stores an information of a reward that is generated for the transaction into a user terminal of the distribution destination indicated by the reward information; and the processor is further configured to display a predetermined screen for receiving input of the reward information.

4. The blockchain system according to claim 3, wherein reward information on a distribution destination of a reward that is generated for the transaction, the reward information including information on the predetermined right holder, and the processor is further configured to generate the token of the asset including the smart contract including the transaction execution function, wherein the transaction execution function stores an information of a reward that is generated for the transaction into a user terminal of the distribution destination indicated by the reward information.

5. The blockchain system according to claim 4, wherein the reward information includes information for determining a distribution destination of the reward and a distribution quantity of the reward to be distributed to the distribution destination, and the processor is further configured to generate the token of the asset including the smart contract including the transaction execution function, wherein the transaction execution function stores an information on the distribution quantity of the reward into a user terminal of the distribution destination indicated by the reward information.

6. The blockchain system according to claim 3, further comprising a predetermined screen for displaying information on the distribution destination to which the reward is distributed by the reward distribution function.

* * * * *